United States Patent [19]

Light et al.

[11] 3,907,908
[45] Sept. 23, 1975

[54] NOVEL TRICYCLIC ALCOHOLS, NOVEL USES OF TRICYCLIC ALCOHOLS AND PROCESSES FOR PREPARING SAME

[75] Inventors: Kenneth K. Light, Asbury Park, N.J.; Edward J. Shuster, Brooklyn, N.Y.; Joaquin F. Vinals, Red Bank; Manfred Hugo Vock, Locust, both of N.J.

[73] Assignee: International Flavors & Fragrances Inc., New York, N.Y.

[22] Filed: Jan. 28, 1974

[21] Appl. No.: 436,848

[52] U.S. Cl. ............ 260/617 F; 131/17 R; 252/89; 252/132; 252/173; 252/522; 260/586 C; 260/586 P; 424/65; 424/69; 424/70; 426/65; 426/175; 426/190; 426/221; 426/222
[51] Int. Cl.$^2$......................................... C07C 35/22
[58] Field of Search.................... 260/617 F

[56] References Cited
FOREIGN PATENTS OR APPLICATIONS

| 788,301 | 3/1973 | Belgium |
| 2,242,913 | 3/1973 | Germany |
| 7,211,760 | 3/1973 | Netherlands |

OTHER PUBLICATIONS

Mirrington et al., "J. Org. Chem.," Vol. 37, No. 18 (1972), pp. 2871–2877.
Corey et al., "Science," Vol. 166 (1969), pp. 178–192.
Danishevsky et al., "Chemical Communication," (1968), pp. 1287–1288.
Umarini et al., "P & E.O.R.," Sept./Oct. 1969, p. 307.
Dobler et al., "Proc. Chem. Soc.," Dec. 1963, p. 383.

*Primary Examiner*—Joseph E. Evans
*Attorney, Agent, or Firm*—Arthur L. Liberman, Esq.; Harold Haidt, Esq.

[57] ABSTRACT

Processes and compositions for altering the flavor and/or aroma of consumable products including foods, tobacco and perfumes utilizing as the essential ingredient at least one organic tricyclic alcohol having the formula:

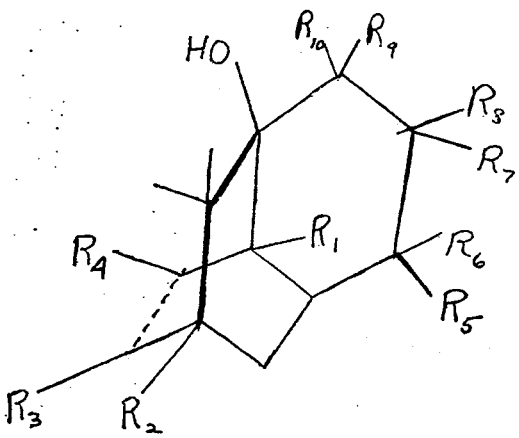

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is a carbon-carbon single bond or a carbon-carbon double bond; wherein $R_1$ is limited to hydrogen when (i) the dashed line is a carbon-carbon single bond; (ii) $R_2$, $R_3$, $R_4$, $R_6$, $R_7$, $R_8$, $R_9$ and $R_{10}$ is hydrogen and (iii) $R_5$ is hydrogen or methyl and wherein when the dashed line is a carbon-carbon single bond, one of $R_3$ or $R_4$ is hydrogen; and processes for preparing the above-mentioned compounds and in addition compounds having similar structures, that is, when the dashed line is either a carbon-carbon single bond or a carbon-carbon double bond; $R_1$, $R_2$, $R_3$, $R_4$, $R_5$, $R_6$, $R_7$, $R_8$, $R_9$ and $R_{10}$ are each the same or different and each represents hydrogen and wherein when $R_3$ or $R_4$ is hydrogen the dashed line represents a carbon-carbon single bond and when $R_3$ and $R_4$ are both methyl, the dashed line represents a carbon-carbon double bond.

2 Claims, No Drawings

NOVEL TRICYCLIC ALCOHOLS, NOVEL USES OF TRICYCLIC ALCOHOLS AND PROCESSES FOR PREPARING SAME

BACKGROUND OF THE INVENTION

The compounds are prepared by first intimately admixing a methyl substituted cyclohexadienone having the structure:

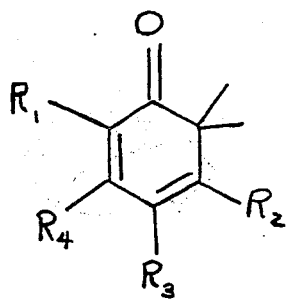

with an acetylenic compound having the structure:

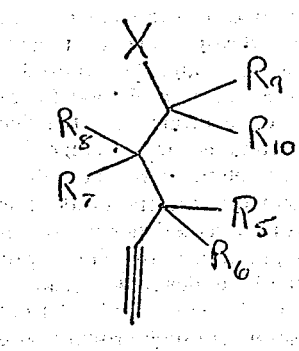

wherein X can be either hydroxyl, bromo or chloro thereby forming a diene compound having the structure:

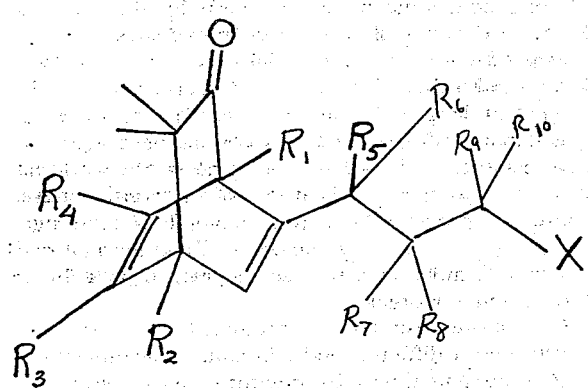

and then hydrogenating the diene compound with hydrogen in the presence of a hydrogenation catalyst thereby producing a ketone having the structure:

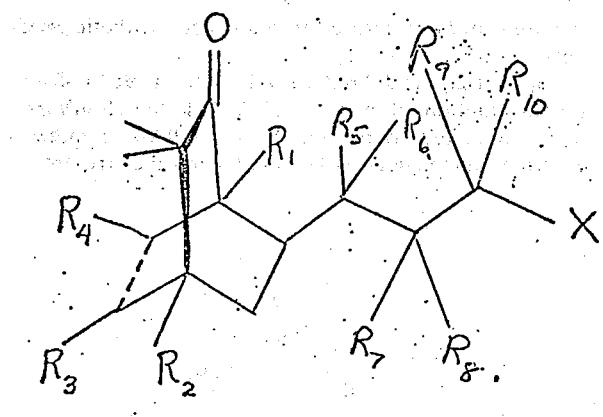

The ketone may either be immediately cyclized using an alkali metal such as sodium, potassium or lithium in the case of X being halogen, or when X is OH, the ketone is first halogenated with a halogenating agent to first form a compound having the structure:

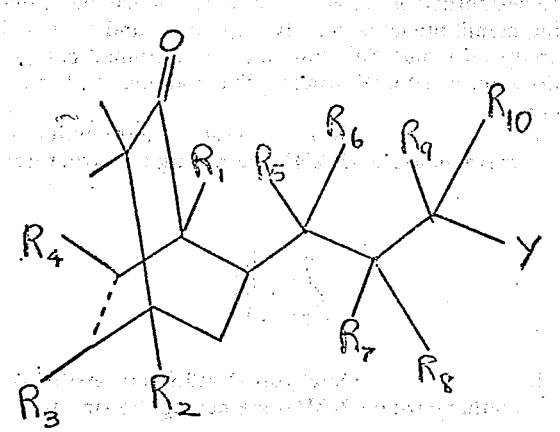

wherein Y is bromo or chloro and subsequently the halogenated compound may then be cyclized using a cyclizing agent.

Materials which can provide patchouli-like, amber and woody fragrance notes are known in the art of perfumery. Many of the natural materials which provide such fragrances and contribute desired nuances to perfumery compositions are high in cost, vary in quality from one batch to another and/or are generally subject to the usual variations of natural products.

There is accordingly a continuing effort to find synthetic materials which will replace the essential fragrance notes provided by natural essential oils or compositions thereof. Unfortunately, many of these synthetic materials either have the desired nuances only to a relatively small degree or else contribute undesirable or unwanted odor to the compositions. The search for materials which can provide a more refined patchouli-like fragrance has been difficult and relatively costly in the areas of both natural products and synthetic products.

Buchi et al., 83 J.Am.Chem.Soc. 927 (1961), shows the production of a material called "patchoulione" which is stated to be octahydro-1,4,9,9-tetramethyl-3a,7-methanoazulen-5(4H)-one having the structure:

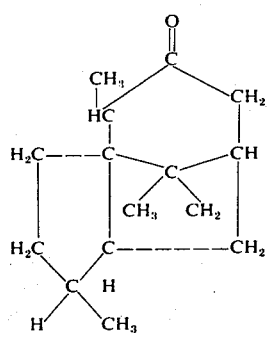

U.S. Pat. No. 3,748,284 issued on July 24, 1973 discloses perhydro derivatives of methanoazulene as having camphoraceous woody fragrances and having the ability to impart this fragrance to perfumed compositions and perfumed articles. The compounds disclosed are:

a.                     Octahydro-1,4,9,9-tetramethyl-4,7-methanoazulen-3(2H)-one having the structure:

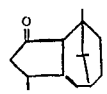

b.                     Octahydro-1,4,9,9-tetramethyl-4,7-methanoazulen-2(3H)-one having the structure:

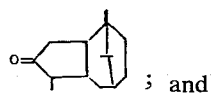 ; and c.                     Octahydro-1,4,9,9-tetramethyl-4,7-methanoazulen-8(7H)-one having the structure:

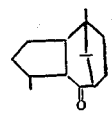

Umarani et al., Sept./Oct. 1969, P. & E.O.R., 307 discloses two compounds relevant to the instant case: "isopatchoulinol" having the structure:

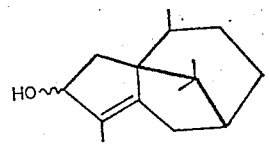

and "patchouli alcohol" having the structure:

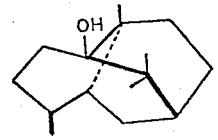

In addition, artificial flavoring agents for foodstuffs have received increasing attention in recent years. In many years, such food flavoring agents have been preferred over natural flavoring agents at least in part due to their diminished cost and their reproducible flavor qualities. For example, natural food flavoring agents such as extracts, concentrates and the like are often subject to wide variations due to changes in the quality, type and treatment of the raw materials. Such variations can be reflected in the end product and result in unfavorable flavor characteristics in said end product. Additionally, the presence of the natural product in the ultimate food may be undesirable because of increase tendency to spoil. This is particularly troublesome in food and food uses where such products as dips, soups, chips, sausages, gravies and the like are apt to be stored prior to use.

The fundamental problem in creating artificial flavor agents is that the artificial flavor to be achieved be as natural as possible. This generally proves to be a difficult task since the mechanism for flavor development in many foods is not completely known. This is noticable in products having woody-balsamic, fresh walnut-kernel and walnut-skin flavor characteristics.

Reproduction of woody-balsamic, fresh walnut-kernel and walnut-skin flavor and aroma has been the subject of long and continuing searches by those engaged in a production of foodstuffs and beverages. The severe shortage of food in many parts of the world has given rise to the development of previously unused sources of protein which are unpalatable. Accordingly, the need has arisen for the use of flavoring materials which will make such sources of protein palatable to human sensory organs.

Even more desirable is a product that can serve to substitute for difficult-to-obtain natural perfumery oils and at the same time substitute for natural flavoring ingredients in both foodstuffs as well as in tobacco.

Mirrington and Schmalzl 37 J.Org.Chem.No. 18, 1972, pages 2871–2877 discloses the isolation of (−) patchouli alcohol having the structure:

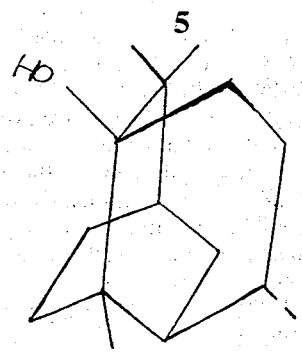

An article by Corey and Wipke entitled "Computer-Assisted Design of Complex Organic Syntheses" appearing in 166 Science 178 (1969) sets forth, interalia, the sequence of reactions leading to compounds having the structures:

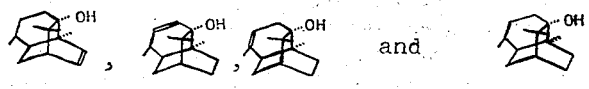

One of these reaction sequences involves performing the reactions:

(A)

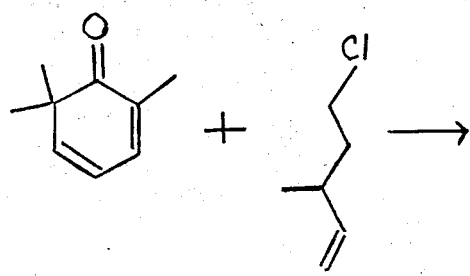

(B)

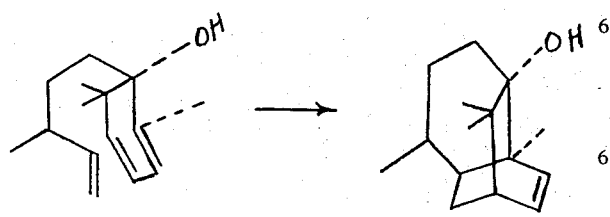

(c)

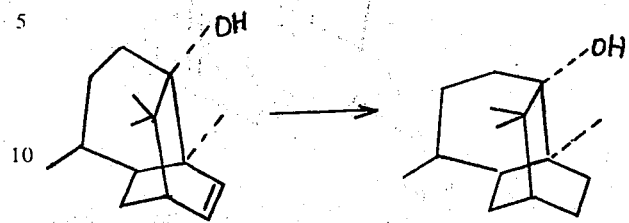

However, syntheses of methyl homologues and double compound isomers and an analogues patchouli alcohol and dihydropatchouli alcohol have not yet been disclosed in the prior art. Indeed, economic syntheses of patchouli alcohol itself do not appear to be given in the literature.

Danishevsky and Dumas 1968 Chemical Communication, Pages 1287–1288 discloses the synthesis of racemic patchouli alcohol and epi patchouli alcohol having the structure:

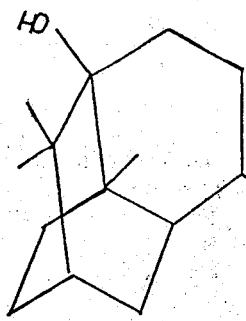

by means of cyclization of a compound having the structure:

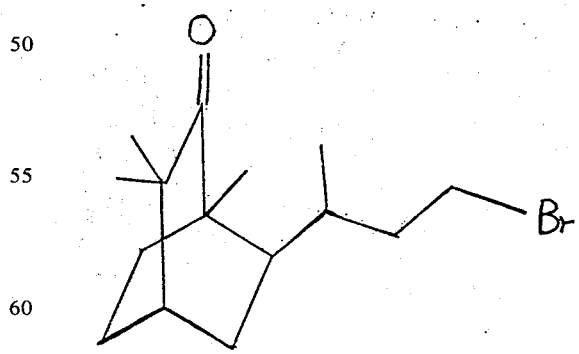

The use of perfumery of the compound having the structure:

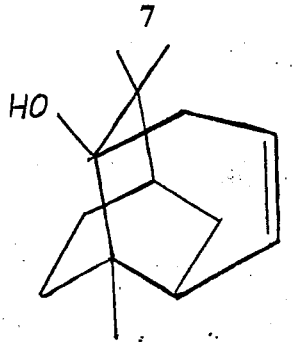

("dehydro-norpatchoulinol") is disclosed in the following patents:
1. Belgium Pat. No. 788,301 issued Mar. 1, 1973
2. German Offenlegungschrift No. 2,242,913 published Mar. 8, 1973
3. Dutch published Application 72/11760 published Mar. 5, 1973

A product of the reduction of this compound is also disclosed ("norpatchoulinol"). This product has the structure:

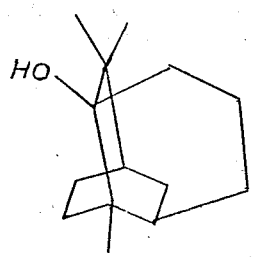

The compounds of our invention have properties considered to be unobvious, unexpected and advantageous with respect to the properties of the above-mentioned prior art compounds.

THE INVENTION

It has now been determined that certain tricyclic alcohols are capable of imparting a variety of flavors and fragrances to various consumable materials. Briefly, our invention contemplates altering the flavors and/or fragrances of such consumable materials by adding thereto a small but effective amount of at least one tricyclic alcohol having the structure:

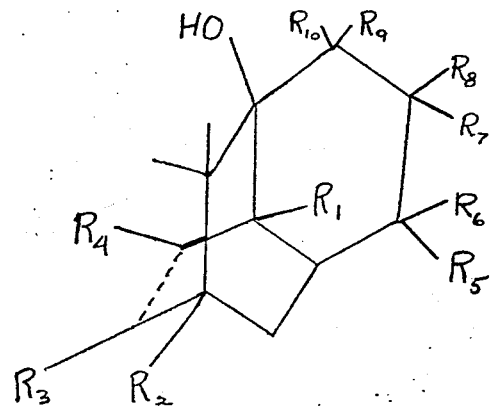

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is a carbon-carbon single bond or a carbon-carbon double bond; wherein $R_1$ is limited to hydrogen when (i) the dashed line is a carbon-carbon single; (ii) $R_2$, $R_3$, $R_4$, $R_6$, $R_7$, $R_8$, $R_9$ and $R_{10}$ is hydrogen and (iii) $R_5$ is hydrogen or methyl and wherein when the dashed line is a carbon-carbon single bond, one of $R_3$ or $R_4$ is hydrogen and flavoring and fragrance compositions containing such tricyclic alcohols. The invention also contemplates novel processes for producing such compounds as well as other compounds having the generic structure set forth above wherein the dashed line is a carboncarbon single bond or a carbon-carbon double bond and each of $R_1$, $R_2$, $R_3$, $R_4$, $R_5$, $R_6$, $R_7$, $R_8$, $R_9$ and $R_{10}$ is the same or different and each represents hydrogen or methyl with the proviso that the dashed line is a carbon-carbon single bond when one of $R_3$ or $R_4$ is hydrogen.

The tricyclic alcohols produced according to the process of our invention, a number of which are used in practicing the part of our invention concerning flavoring and fragrance compositions are actually racemic mixtures rather than individual steroisomers, such as the case concerning isomers of patchouli alcohol which are so obtained from patchouli oil.

Specific examples of novel products or synthesis which have been found to be useful for the purposes of our invention are as follows:

A. The compound having the structure:

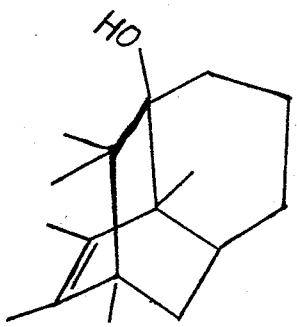

This compound has a warm patchouli-like fragrance aroma and a woody-balsamic, walnut-kernel and walnut-skin like taste in food flavors.

B.

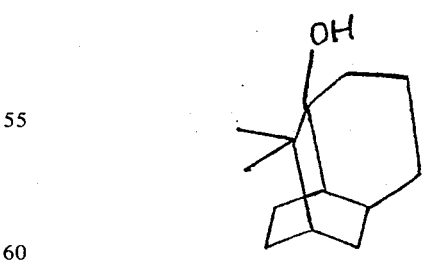

This compound has a warm patchouli fragrance and a woody-balsamic, walnut-kernel and walnut-skin like taste.

The tricyclic alcohols prepared according to the present invention can be obtained by means of two closely related reaction sequences; set forth below:

The first route comprises first intimately admixing a methylcyclohexadienone having the structure:

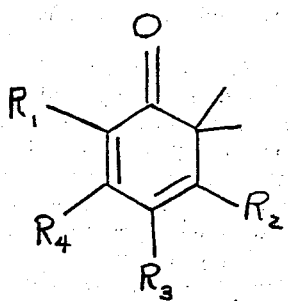

with an acetylenic compound having the structure:

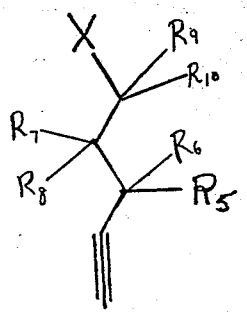

wherein X may be either hydroxyl, bromo and chloro thereby forming a diene compound having the structure:

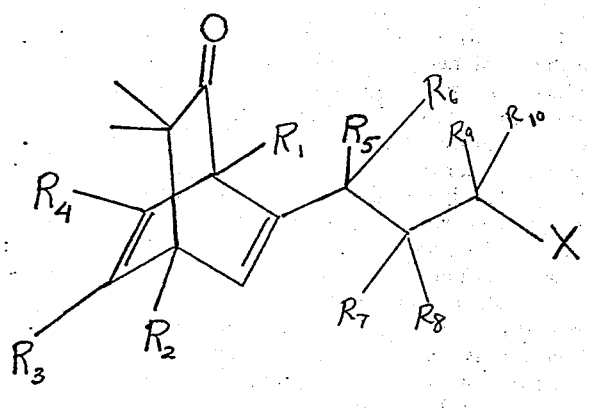

In this reaction, it is best to proceed at a temperature in the range of 200°–260°C with the most preferred temperature being 220°C. The reaction may be carried out in the presence of an inert solvent such as benzene, hexane or cyclohexane (or any other inert solvent) or the reaction may be carried out in the absence of solvent. Although, either the acetylenic compound or the cyclohexadienone may be used in excess, it is preferred to use equimolar quantities of each reactant.

The above-mentioned diene compound is then hydrogenated with hydrogen in the presence of a catalyst such as palladium, platinum, nickel or other suitable hydrogenation catalyst.

The reaction temperature may be from 20°–220°C with a temperature range of 100°–200°C being preferred. The reaction is preferably carried out at superatmospheric pressures and pressures in the range of 1–150 atmospheres are suitable. Preferred pressures range from 5–150 atmospheres.

The hydrogenation reaction gives rise to a ketone product having the structure:

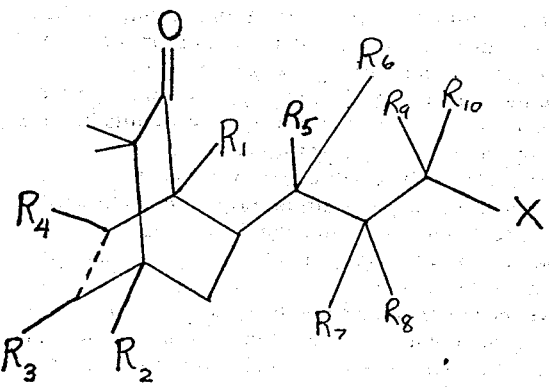

but it is noteworthy that the compound produced is one where the dashed line is a carbon-carbon single bond if one of $R_3$ or $R_4$ is hydrogen and the compound is primarily one where the dashed line is a carbon-carbon double bond if $R_3$ and $R_4$ are both methyl.

When X is halogen, the ketone thus produced may then be immediately cyclized by treating same with an alkali metal selected from the group consisting of sodium, potassium or lithium. The cyclization may be carried out in diethyl ether, tetrahydrofuran or benzene. The reaction temperature preferred is the reflux temperature of the reaction mass at atmospheric pressure and is a function of the solvent used. Thus, for example, when using tetrahydrofuran solvent, the cyclization reaction temperature is approximately 65°C. The reaction can be carried out at temperatures ranging from 0°C up to 100°C. For the cyclization, the mole ratio of ketone to metal is preferably 7:1 although mole ratio of ketone to metal is from 1:1 up to 10:1 may be used.

Prior to cyclization, in the event that X is OH, the ketone must be halogenated with thionyl chloride or any other suitable halogenating agent, for example, thionyl chloride-pyridine complex, phosphorous-tri-chloride, phosphorous-tri-bromide, aqueous HCl or aqueous HBr. The halogenation reaction may be carried out in the presence or in the absence of an inert solvent such as benzene, toluene, cyclohexane or pyridine. The reaction temperature may range from 20°C up to 100°C with a reaction temperature of 80°C being preferred. The mole ratio of halogenating agent:ketone of 3:1 is preferred when using thionyl chloride and a ratio of 10:1 is preferred when using aqueous HCl and HBr.

The initial reaction may utilize, for example, the following reactants:
(a) Acetylenic compounds:
  3-Methylpent-4-yn-1-ol
  3-Methylpent-4-yn-1-chloride
  3-Methylpent-4-yn-1-bromide
  Pent-4-yn-1-ol
  Pent-4-yn-1-chloride Pent-4-yn-1-bromide (b) Cyclohexadienone compounds:
2,6,6-Trimethylcyclohexadien-1-one
2,3,4,5,6,6-Hexamethylcyclohexadien-1-one
2,3,4,6,6-Pentamethylcyclohexadien-1-one
6,6-Dimethylcyclohexadien-1-one
4,5,6,6-Tetramethylcyclohexadien-1-one
2,4,5,6,6-Pentamethylcyclohexadien-1-one When the final cyclization reaction is completed, the reaction mixture is "worked-up" using routine purification procedures including the unit operations of extraction, crystallization, drying and/or distillation.

The individual tricyclic compounds of our invention can be obtained in purer form or in substantially pure form by conventional purification techniques. Thus, the products can be purified and/or isolated by distillation, extraction, crystallization, preparative chromatographic techniques, and the like. It has been found desirable to purify the tricyclic compounds by fractional distillation by vacuum.

It will be appreciated from the present disclosure that the tricyclic compounds and mixtures thereof according to the present invention can be used to alter, vary, fortify, modify, enhance or otherwise improve the flavor of a wide variety of materials which are ingested, consumed, or otherwise organoleptically sensed.

The term "alter" in its various forms will be understood herein to mean the supplying or imparting of a flavor character or note to an otherwise bland, relatively tasteless substance, or augmenting an existing flavor characteristic where the natural flavor is deficient in some regard or supplementing the existing flavor impression to modify the organoleptic character.

Such compounds are accordingly useful in flavoring compositions. A flavoring composition is taken to mean one which contributes a part of the overall flavor impression by supplementing or fortifying a natural or artificial flavor in a material or one which supplies substantially all the flavor and/or aroma character to a consumable article.

The term "footstuff" as used herein includes both solid and liquid ingestible materials for man or animals, which materials usually do, but need not, have nutritional value. Thus, foodstuffs includes meats, gravies, soups, convenience foods, malt, alcoholic, and other beverages, milk and dairy products, seafoods including fish, crustaceans, mollusks, and the like, candies, vegetables, cereals, soft drinks, snacks, dog and cat food, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as products such as snuff, chewing tobacco, and the like.

When the tricyclic compounds of this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensifiers.

Such conventional flavoring materials include saturated fatty acids, unsaturated fatty acids and amino acids; alcohols, including primary and secondary alcohols; esters; carbonyl compounds including ketones and aldehydes; lactones; other cyclic organic materials including benzene derivatives, alicyclic compounds, heterocyclics such as furans, pyridines, pyrazines and the like; sulfur-containing materials including thiols, sulfides, disulfides and the like; proteins; lipids, carbohydrates; so-called flavor potentiators such as monosodium glutamate, guanylates, and inosinates; natural flavoring materials such as cocoa, vanilla, and caramel; essential oils and extracts such as anise oil; clove oil; and the like; and artificial flavoring materials such as vanillin; and the like.

Specific flavor adjuvants are as follows:
Ethyl-2-methyl butyrate;
Vanillin;
Butyl valerate;
2,3-Diethyl pyrazine;
Methyl cyclopentenolone;
Benzaldehyde;
Valerian oil Indian; and
Propylene glycol The tricyclic compounds of our invention can be used to contribute warm, patchouli-like aromas. As olfactory agents the tricyclic compounds of this invention can be formulated into or used as components of a "perfume composition".

The term perfume composition is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note of the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by highlighting or moderating the olfactory reaction contributed by another ingredient in the composition.

The amount of the tricyclic compounds of this invention which will be effective in perfume compositions depends on many factors, including the other ingredients, their amounts and the effects which are desired. It has been found that perfume compositions containing as little as 2 percent of the tricyclic compounds of this invention, or even less, can be used to impart a patchouli scent to soaps, cosmetics, and the other products. The amount employed can range up to 50 percent or higher and will depend on considerations of cost, nature of the end product, the effect desired on the finished product and particular fragrance sought.

The tricyclic compounds of this invention can be used alone or in a perfume composition as an olfactory component in detergents and soaps, space odorants and deodorants; perfumes; colognes; toilet waters; bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01 percent of one or more of the tricyclic compounds will suffice to impart a warm patchouli aroma. Generally, no more than 0.5 percent is required.

In addition, the perfume composition can contain a vehicle or carrier for the tricyclic compounds alone or with other ingredients. The vehicle can be a liquid such as an alcohol such as ethanol, a glycol such as propylene glycol, or the like. The carrier can be an absorbent solid such as a gum or components for encapsulating the composition.

The following examples are given to illustrate embodiments of the invention as it is presently preferred to practice it. It will be understood that these examples are illustrative, and the invention is not to be considered as restricted thereto except as indicated in the appended claims.

EXAMPLE I

PREPARATION OF 3,3-DIMETHYL-6-(3-CHLOROPROPYL)-BICYCLO-[2.2.2]OCTA-5,7-DIENE-2-ONE

Into an autoclave, 28 gm. of 6,6-dimethyl cyclohexadien-1-one, 28 gm. of 5-chloro-1-pentyne and 300 ml of benzene are added. The autoclave is sealed and the reaction mass is heated to 220°C. The reaction is carried out over a period of 4 hours after which time the reaction mass is cooled to 20°C. The reaction mass is then removed from the autoclave and the resultant product is stripped of benzene and distilled at a vapor temperature of 136°–138°C and 3.0–3.2 mm. Hg. pressure. The structure of the resultant product is confirmed by NMR, IR and mass spectral analyses to be 3,-3-dimethyl-6-(3-chloropropyl)-bicyclo-[2.2.2]-octa-5,7-diene-2-one.

EXAMPLE II

PREPARATION OF 3,3-DIMETHYL-6-(3-CHLOROPROPYL)-BICYCLO-[2.2.2]-OCTAN-2-ONE

Into an autoclave are placed 20 gm. of 3,3-dimethyl-6-(3-chloropropyl)-bicyclo-[2.2.2]-octa-5,7-diene-2-one produced by the process of Example I and, in addition, 300 ml ethyl alcohol and 1 gm. of palladium-carbon catalyst. The autoclave is sealed and then charged with hydrogen at a pressure of 200 pounds per square inch. The reaction mass is stirred for a period of 5 hours at a temperature of 100°–115°C during which period the pressure in the autoclave varies from 240 up to 260 pounds per square inch. The autoclave is then cooled and the product is removed and distilled. Two products are obtained. The first has a boiling point of 90°–100°C at 1.5 mm. Hg. pressure and is shown by IR, MS and NMR to be 3,3-dimethyl-6-propyl-bicyclo-[2.2.2]-octane-5-one. The second is the desired material, 3,3-dimethyl-6-(3-chloropropyl)-bicyclo-[2.2.2]-octan-2-one with a boiling point of 131°C at 1.5 mm. Hg. pressure weighing 8.2 gms.

EXAMPLE III

PREPARATION OF OCTAHYDRO-9,9-DIMETHYL-1,6-METHANONAPHTHALENE-1-(2H)-OL

Into a 250 ml three-neck flask equipped with stirrer, thermometer and reflux condenser, the following materials are placed:

| | |
|---|---|
| Sodium spheres | 1.5 gms. |
| Tetrahydrofuran | 50.0 ml |
| 3,3-dimethyl-6-(3-chloropropyl)-bicyclo-[2.2.2]-octan-2-one | 1.4 gms. |

The reaction mass is refluxed for a period of 4 hours and allowed to stand overnight. The liquid phase is separated from the sodium spheres. The liquid phase is then washed with 100 ml water and acidified with dilute hydrochloric acid. The resultant material is extracted twice with diethyl ether. The combined ether phases are washed with saturated aqueous $NaHCO_3$ and then dried over anhydrous magnesium sulfate. The solution is stripped of sovent and the remaining residue is separated on a GLC column:

(1/8 inch × 4', 20 percent SE-30 (a methyl silicone oil available from Analabs, Inc. of P.O. 501, North Haven, Connecticut 06473); 100°–220°C at 8°C/min.).

The structure of the major product of the reaction (43 percent by GLC) was shown to be the title material.

Mass spectral analysis is as follows: 41, 55, 84, 97, 133, and 110.

NMR analysis is as follows: 1.06(s,6H), complex signals from 1.0 to 2.1 ppm.

EXAMPLE IV

PREPARATION OF 1,3,3-TRIMETHYL-6-(1-METHYL-3-HYDROXYPROPYL)-BICYCLO-[2.2.2]-OCTA-5,7-DIEN-2-ONE

A solution of 27.2 gm. (0.20 ml) of 2,6,6-trimethylcyclohexadien-1-one and 28 gm. (0.28 ml) of 3-methylpent-4-yn-1-ol in 300 cc of benzene is placed in a 2 liter stirred autoclave and heated to 220°C for 5 hours. At the end of this time, GLC shows no trimethylcyclohexadien-1-one remaining and the solvent is removed under vacuum and the residue is distilled to yield about 37 gm. (80%) of the product, 1,3,-3-trimethyl-6-(1-methyl-3-hydroxypropyl)-bicyclo-[2.2.2]-octa-5,7-dien-2-one.

EXAMPLE V

PREPARATION OF 1,3,3-TRIMETHYL-6-(1-METHYL-3-HYDROXYPROPYL)-BICYCLO-[2.2.2]-OCTAN-2-ONE

Into a stirred autoclave, 30 gm. (0.13 ml) of 1,3,3-trimethyl-6-(1-methyl-3-hydroxypropyl)-bicyclo-[2.2.2]-octa-5,7-dien-2-one, 0.5 gm. of 5 percent of palladium-carbon and 300 ml of isopropyl alcohol is added. The autoclave is pressurized to 400 pounds per square inch with hydrogen and heated to 100°C for 6 hours. At the end of this time, the mixture is filtered, stripped of solvent and vaccum distilled, yielding about 27 gm. (90%) of the product, 1,3,3-trimethyl-6-(1-methyl-3-hydroxypropyl)-bicyclo-[2.2.2]-octan-2-one.

EXAMPLE VI

PREPARATION OF 1,3,3-TRIMETHYL-6-(1-METHYL-3-CHLOROPROPYL)-BICYCLO-[2.2.2]-OCTAN-2-ONE

A mixture of 25 gm. (0.105 mole) of 1,3,3-trimethyl-6-(1-methyl-3-hydroxypropyl)-bicyclo-[2.2.2]-octan-2-one and 40 gm. of thionylchloride is gently refluxed for two hours. The excess thionylchloride is stripped off and the residue is distilled to yield about 20 gm. (80%) of the product, 1,3,3-trimethyl-6-(1-methyl-3-chloropropyl)-bicyclo-[2.2.2]-octan-2-one.

EXAMPLE VII

PREPARATION OF PATCHOULI ALCOHOL

A sodium sand is prepared by heating 11.5 gm. of sodium in xylene and stirring. The xylene is decanted and replaced by 300 cc of anhydrous tetrahydrofuran. A solution of 20 gm. (0.078 mole) of 1,3,3-trimethyl-6-(1-methyl-3-chloropropyl)-bicyclo-[2.2.2]-octan-2-one in 50 cc of tetrahydrofuran is added with stirring at room temperature over a 15 minute period. A slight exotherm occurred during addition. The solution is brought to reflux and held there for 3 hours. At the end of this time, the solution is decanted from the excess sodium and is acidified with 5 percent HCl. The excess acid is neutralized by a single wash with saturated sodium bicarbonate solution. The solution is dried over magnesium sulfate, filtered and stripped, yielding a residue which is recrystallized from hexane to yield about 10 gm. (50%) of racemic patchouli alcohol, mp 39°–40° having the structure:

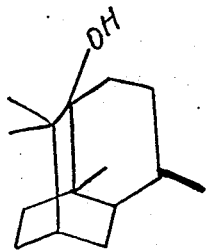

EXAMPLE VIII

Perfume Formulation

The following "woody cologne" perfume formulation is prepared:

| Ingredients | Parts by Weight |
| --- | --- |
| Bergamot oil | 150 |
| Orange oil | 200 |
| Lemon oil | 50 |
| Eugenol | 10 |
| 4-(4-methyl-4-hydroxy amyl) Δ³ cyclohexene carboxaldehyde | 40 |
| Ylang | 2 |
| Petitgrain Paraguay | 10 |
| Gamma methyl ionone | 20 |
| 3a-Methyl-dodecahydro-6,6,9a-trimethylnaphtho-(2,1-b) furan | 5 |
| Product produced by reaction of acetic anhydride, polyphosphoric acid and 1,5,9-trimethyl cyclododecatriene-1,5,9 according to the process of Example I of U.S. Patent 3,718,697 | 5 |
| Octahydro-9,9-dimethyl-1,6-methanonaphthalene-1-(2H)-ol produced according to Example III | 15 |

Octahydro-9,9-dimethyl-1,6-methanonaphthalene-1-(2H)-ol imparts a warm patchouli-like character to this woody cologne composition.

EXAMPLE IX

Preparation of a Soap Composition

A total of 100 gm. of soap chips produced from unperfumed sodium base toilet soap made from tallow and coconut oil are mixed with 1 gm. of the perfume composition set forth in Example VIII until a substantially homogeneous composition is obtained. The soap composition manifests a characteristic woody cologne aroma having a warm patchouli-like character.

EXAMPLE X

Preparation of a Soap Composition

A total of 100 gm. of soap chips produced from unperfumed sodium base toilet soap made from tallow and coconut oil is mixed with 1 gm. of octahydro-9,9-dimethyl-1-methanonaphthalene-1-(2H)-ol until a substantially homogeneous composition is obtained. The soap composition manifests a warm patchouli-like character.

EXAMPLE XI

Preparation of a Detergent Composition

A total of 100 gm. of a detergent powder sold under the trademark "RINSO" are mixed with 0.15 gm. of a perfume composition containing the mixture obtained in Example VIII until a substantially homogeneous composition having a woody cologne fragrance with a warm patchouli-like character is obtained.

EXAMPLE XII

Preparation of a Cosmetic Base

A cosmetic powder is prepared by mixing 100 gm. of talcum powder with 0.25 gm. of the perfume composition of Example VIII in a ball mill. A second cosmetic powder is similarly prepared except that the mixture produced in Example VIII is replaced with the product produced in Example III, octahydro-9,9-dimethyl-1,6-methanonaphthalene-1-(2H)-ol. The cosmetic powder containing the material of Example VIII has a woody cologne fragrance with a warm patchouli-like character. The cosmetic powder produced using this material of Example III has a warm natural patchouli-like character.

EXAMPLE XIII

Liquid Detergent Containing Octahydro-9,9-Dimethyl-1,6-Methanonaphthalene-1-(2H)-Ol Concentrated liquid detergents with a patchouli-like odor containing 0.2 percent, 0.5 percent and 1.2 percent of the product produced in accordance with the process of Example III, octahydro-9,9-dimethyl-1,6- methanonaphthalene-1-(2H)-ol, are prepared by adding the appropriate quantity of octahydro-9,9-dimethyl-1,6-methanonaphthalene-1-(2H)-ol to the liquid detergent known as P-87. The patchouli aroma of the liquid detergent increases with increasing concentration of the octahydro-9,9-dimethyl-1,6-methanonaphthalene-1-(2H)-ol of this invention.

EXAMPLE XIV

Preparation of Cologne and Handkerchief Perfume

The composition of Example VIII is incorporated in a cologne having a concentration of 2.5 percent in 85 percent aqueous ethanol; and into a handkerchief perfume in a concentration of 20 percent (in 95 percent ethanol). The use of the composition of Example VIII affords a distinct and definite woody cologne aroma having a warm patchouli-like character to the handkerchief perfume and to the cologne.

EXAMPLE XV

Cologne and Handkerchief Perfume

The octahydro-9,9-dimethyl-1,6-methanonaphthalene-1-(2H)-ol produced by the process of Example III is incorporated into a cologne having a concentration of 2.5 percent in 85 percent ethanol; and into a handkerchief perfume in a concentration of 10 percent (in 95 percent ethanol). The octahydro-9,9-dimethyl-1,6-methanonaphthalene-1-(2H)-ol produced in Example III affords a distinct and definite warm patchouli-like aroma to the handkerchief perfume and to the cologne.

EXAMPLE XVI

Flavor Composition

The following basic walnut flavor formulation is prepared:

| Ingredients | Parts by Weight |
|---|---|
| Ethyl-2-Methyl Butyrate | 10 |
| Vanillin | 40 |
| Butyl Valerate | 40 |
| 2,3-Diethyl Pyrazine | 5 |
| Methyl Cyclopentenolone | 80 |
| Benzaldehyde | 60 |
| Valerian Oil Indian (1% in 95% aqueous ethanol alcohol) | 0.5 |
| Propylene Glycol | 764.5 |

Octahydro-9,9-dimethyl-1,6-methanonaphthalene-1-(2H)-ol produced by the process of Example III is added to the above formulation at the rate of 1.5 percent. This formulation is compared to a formulation which does not have octahydro-9,9-dimethyl-1,6-methanonaphthalene-1-(2H)-ol added to it, at the rate of 20 ppm in water. The formulation containing octahydro-9,9-dimethyl-1,6-methanonaphthalene-1-(2H)-ol has a "woody-balsamic", fresh walnut kernel and walnut skin-like taste and, in addition, has a fuller mouthfeel and longer lasting taste. The flavor that has added to it, octahydro-9,9-dimethyl-1,6-methanonaphthalene-1-(2H)-ol, is preferred by a group of flavor panelists, and they consider it to be a substantially improved walnut flavor.

EXAMPLE XVII

Beverage

The addition of octahydro-9,9-dimethyl-1,6-methanonaphthalene-1-(2H)-ol prepared by the process of Example III at the rate of 0.3 ppm to a commercial Cola beverage gives the beverage a fuller woody-balsamic long lasting taste and adds to the pleasant top notes of the beverage. When comparing the Cola beverage containing octahydro-9,9-dimethyl-1,6-methanonaphthalene-1-(2H)-ol to one having the same formula but not containing octahydro-9,9-dimethyl-1,6-methanonaphthalene-1(2H)-ol, a five member branch panel prefers the beverage containing the octahydro-9,9-dimethyl-1,6-methanonaphthalene-1-(2H)-ol.

EXAMPLE XVIII

Tobacco Flavor Formulation

Cigarettes are produced using the following tobacco formulation:

| Ingredients | Parts by Weight |
|---|---|
| Bright | 40.1 |
| Burley | 24.9 |
| Maryland | 1.1 |
| Turkish | 11.6 |
| Stem (flue-cured) | 14.2 |
| Glycerine | 2.8 |
| $H_2O$ | 5.3 |

At the rate of 0.2 percent, the following tobacco flavor formulation is applied to all of the cigarettes produced with the above tobacco formulation.

| Ingredients | Parts by Weight |
|---|---|
| Ethyl Butyrate | .05 |
| Ethyl Valerate | .05 |
| Maltol | 2.00 |
| Cocoa Extract | 26.00 |
| Coffee Extract | 10.00 |
| Ethyl Alcohol (95%) | 20.00 |
| $H_2O$ | 41.90 |

To 50 percent of the cigarettes, 10 and 20 ppm of octahydro-9,9-dimethyl-1,6-methanonaphthalene-1-(2H)-ol are added. These cigarettes are hereinafter called "experimental" cigarettes and the cigarettes without the octahydro-9,9-dimethyl-1,6-methanonaphthalene-1-(2H)-ol are hereinafter called "control" cigarettes. The control and experimental cigarettes are then evaluated by paired comparison and the results are as follows:

a. In aroma, the experimental cigarettes are found to be more aromatic.
b. In smoke flavor, the experimental cigarettes are found to be more aromatic, more sweet, more bitter, more green, richer and slightly less harsh in the mouth and more cigarette tobacco-like than the control cigarettes.

The experimental cigarettes containing 20 ppm of octahydro-9,9-dimethyl-1,6-methanonaphthalene-1-(2H)-ol are found to be woody, slightly chemical and mouth-coating in the smoke flavor.

All cigarettes both control and experimental, are evaluated for a smoke flavor with 20 mm cellulose acetate filter. Octahydro-9,9-dimethyl-1,6-methanonaphthalene-1-(2H)-ol enhances the tobacco-like taste of the blended cigarette.

EXAMPLE XIX

Preparation of
1,3,3,4,7,8-Hexamethyl-6-(3-Hydroxypropyl)-Bicyclo-(2.2.2)-Octa-5,7-Dien-2-One Into a two liter autoclave, the following ingredients are placed:

| Ingredients | Parts by Weight |
| --- | --- |
| 2,2,3,4,5,6-Hexamethyl-Cyclohexa-3,5-dien-1-one | 63.1 gm. |
| 4-Pentyn-1-ol | 29.7 gm. |
| Benzene | 300.0 ml |

The reaction mass is stirred after the autoclave is sealed for a period of 2½ hours at 215°–220°C. After standing overnight, an additional of 7.5 gm. of 4-pentyn-1-ol is added and the mixture is again stirred at 220°C for an additional 2 hours. The mixture is then removed from the autoclave and stripped of solvent yielding 94.1 gm. of a highly viscous material. This highly viscous material is distilled through a micro-vigreaux rushover column at approximately 1.0 mm. Hg. pressure, yielding 50.8 gm. of the title material, 1,-3,3,4,7,8-hexamethyl-6-(3-hydroxypropyl)-bicyclo-(2.2.2)-octa-5,7-dien-2-one, which was 89.8 percent by GLC.

Mass spectral analysis is as follows: m/e = 178, 191, 41, 147, 247

Infra-red analysis gives a characteristic peak at 1702 cm$^{-1}$.

NMR Analysis is as follows: 0.92(s,3H), 0.95(s,3H), 1.40(s,6H), 1.66(s,3H), 1.76(s,3H), 2.10(m,2H), 3,64(t,2H), 5.72(m,1H) ppm.

EXAMPLE XX

Preparation of
1,3,3,4,7,8-Hexamethyl-6-(3-Hydroxypropyl)-Bicyclo-(2.2.2)-Oct-7-En-2-One Into a 2 liter autoclave, the following ingredients are placed:

| Ingredients | Parts by Weight |
| --- | --- |
| 1,3,3,4,7,8-hexamethyl-6-(3-hydroxypropyl)-bicyclo-(2.2.2)-octa-5,7-dien-2-one | 50 gm. |
| 5% Palladium on carbon | 1 gm. |
| Isopropyl alcohol | 300 ml. |

The autoclave is pressurized to 150 pounds per square inch with hydrogen and heated to 100°C (where upon the pressure inside the autoclave reaches 180 pounds per square inch). The reaction mass is then stirred in the autoclave for a period of 3 hours at 100°C. GLC, mass spectral and IR analyses indicate that a major component of the reaction mass is the title material.

Mass spectral analysis is as follows: m/e = 135, 178, 41, 150, 194, 119, 264 (Parent peak)

EXAMPLE XXI

Preparation of
1,3,3,4,7,8-Hexamethyl-6-(3-Chloropropyl)Bicyclo-(2.2.2)-Oct-7-En-2-One Into a 250 ml three-neck flask equipped with dropping funnel, nitrogen inlet tube, thermometer and reflux condenser, the following materials are placed:

| Ingredients | Parts by Weight |
| --- | --- |
| Pyridine | 11.5 gm. |
| 1,3,3,4,7,8-hexamethyl-6-(3-hydroxypropyl)-bicyclo-(2.2.2)-oct-7-en-2-one | 13.0 gm. |

16.0 gm. of thionyl chloride is added dropwise with stirring to the reaction mass over a period of 25 minutes. During this time, the reaction mass temperature rises rapidly and is controlled by the use of an ice bath so as not to exceed 50°C. After the addition of the thionyl chloride is completed, 5.8 gm. of pyridine and then an additional 8.0 gm. of thionyl chloride is added while maintaining the temperature of the reaction mass at 40°C. The reaction mass is then stirred for a period of 3 hours at room temperature and is then extracted with seven 40 ml portions of diethyl ether. The combined ether extracts are then stripped on a rotary evaporator. The resulting residue is washed with 100 ml of water. Methylene chloride is added to facilitate separation of the resulting aqueous and organic layers. The water wash is back-extracted with methylene chloride and the combined methylene chloride phases are washed over once more with water and then dried and stripped. The resulting residue weighs 27.4 gm. Mass spectral and IR analyses yield information that the resulting product is the title compound.

Mass spectral analysis is as follows: m/e = 135, 178, 41, 212 282 (Parent peak)

EXAMPLE XXII

Preparation of
Hexahydrohexamethylmethanonaphthalenol

Into a 250 ml three neck flask equipped with stirrer, thermometer, reflux condenser, heating mantle and nitrogen inlet tube, the following ingredients are placed:

| Ingredients | Parts by Weight |
| --- | --- |
| Sodium sand produced by vigorously shaking sodium spheres in hot xylene | 2.2 gm. |
| Tetrahydrofuran | 75.0 ml |
| 1,3,3,4,7,8-hexamethyl-6-(3-chloropropyl) bicyclo-(2.2.2)-oct-7-en-2-one | 2.0 gm. |

The reaction mass is stirred at reflux for a period of 30 minutes. After the 30 minute period, the sodium sand coagulates into one lump. Stirring is continued at reflux for a period of 3 additional hours. The mixture is then cooled and the liquid is decanted from the sodium. The reaction product is then added to 100 ml of water and the mixture is acidified to a pH of 3 with 5 percent hydrochloric acid. 50 ml of diethyl ether is then added and the layers are then separated. The aqueous layer is extracted once with 50 ml of diethyl ether. The ether layers are combined and are washed (i) with water, followed by (ii) saturated sodium bicarbonate solution, and then (iii) water. The diethyl ether solution is then dried over anhydrous magnesium sulfate and then stripped on a rotary evaporator yielding 2.0 gm. of product. Mass spectral, IR, NMR and GLC analyses yield the information that the major product is the title compound, having the structure:

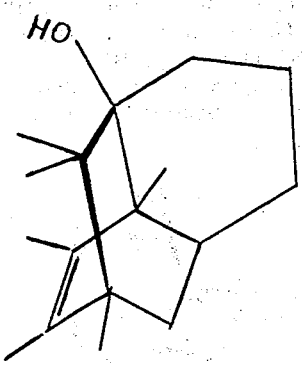

EXAMPLE XXIII

Preparation of
1,3,3-Trimethyl-6-(3-Hydroxypropyl)-Bicyclo-(2.2.2)-Octa-5,7-Dien-2-One Into a 2 liter autoclave, the following ingredients are added:

| Ingredients | Parts by Weight |
| --- | --- |
| 2,2,6-Trimethyl cyclohexadienone | 25.0 gm. |
| 4-Pentyn-1-ol | 25.0 gm. |
| Benzene | 300.0 ml |

The autoclave is sealed and the reaction mass is stirred for a period of 12½ hours at 220°C. The reaction mass is then removed from the autoclave and stripped of solvent on a rotary evaporator. A GLC sample of the material shows no 2,2,6-trimethylcyclohexadienone remaining (⅛ inch × 10', 10 percent carbowax; 80°–220°C at 8°C/min.). The residue (58.1 gm.) is rush distilled on a micro vigreaux column under vacuum, yielding 29.8 gm. of a product of boiling point 150°C at 1.5 mm. Hg. pressure. Mass spectral, IR and NMR analyses yield the information that the product is the title compound.

Mass spectral analysis is as follows: m/e = 70, 105, 106, 42, 117, 91

Infra-red analysis shows a characteristic peak at 1709 $cm^{-1}$.

NMR analysis is as follows:
1.06(s,6H), 1.45(s,3H),
1.70(m,2H), 2.17(m,2H),
3.40(m,1H), 3.62(t,2H),
6.05(m,2H), 6.53(t,1H)

EXAMPLE XXIV

Preparation of
1,3,3-Trimethyl-6-(3-Hydroxypropyl)-Bicyclo-(2.2.2)-Octan-2-One

Into a two liter autoclave, the following ingredients are added:

| Ingredients | Parts by Weight |
| --- | --- |
| 5% Platinum on carbon, prereduced | 0.5 gm. |
| 1,3,3-trimethyl-6-(3-hydroxypropyl)-bicyclo-(2.2.2)-octa-5,7-dien-2-one | 27.8 gm. |
| Isopropyl alcohol | 300.0 ml |

The autoclave is sealed and pressurized to 80 pounds per square inch with hydrogen. The reaction mass is heated to 100°C and the pressure rises to 220 pounds per square inch. Heating and stirring is continued until GLC or mass spectral analyses indicates reaction is complete (about 20 hours). The autoclave is vented and the reaction mass is filtered and stripped of solvent, yielding 25.4 gm. of residue. Distillation under vacuum gave a 50 percent yield of the title material, boiling point 148°–150°C at 1.5 mm. Hg. pressure.

Mass spectral, IR and NMR analyses confirm the postulated structure.

EXAMPLE XXV

Preparation of
1,3,3-Trimethyl-6-(3-Chloropropyl)-Bicyclo-(2.2.2)-Octan-2-One

Into a 50 ml flask equipped with reflux condenser, thermometer and addition funnel, the following ingredients are added:

| Ingredients | Parts by Weight |
| --- | --- |
| 1,3,3-Trimethyl-6-(3-hydroxypropyl)-bicyclo-(2.2.2)-octan-2-one | 13.8 gm. |
| Benzene | 6.0 ml. |

14 gm. of thionyl chloride is added to the reaction mass over a period of 5 minutes with stirring, the addition causing an exothermic reaction. The reaction mass temperature rises to 55°C. Following addition, the mixture is stirred for 3 hours at reflux. The pot temperature is initially 92°C at reflux, but rises to 100°C after a period of 3 hours.

After cooling, the mixture is poured onto 100 gm. of ice. The resulting ice mixture is then allowed to warm to room temperature and is then neutralized with sodium bicarbonate and the reaction mass-ice mixture is extracted 4 times with diethyl ether. The combined ether extracts are dried over anhydrous magnesium sulfate and filtered. The ether is then stripped on a rotary evaporator yielding 14.4 gm. of residue. The residue is rush-distilled on a micro vigreaux column at a temperature of 143°–144°C at a pressure of 1.2 mm. Hg. Mass spectral, IR and NMR analyses yield the data that the product is the title compound.

Mass spectral analysis is as follows: m/e = 82, 170, 171, 41, 242 (Parent peak)

NMR analysis is as follows: 0.91(s,3H), 1.07(s,3H), 1.11(s,3H), 1.4–2.1 (signal for 12H), 3.47(t,2H) ppm.

EXAMPLE XXVI

Synthesis of Dihydronorpatchoulinol

Into a 500 ml flask fitted with a condenser, stirrer, thermometer and nitrogen inlet tube, the following materials are placed:

| Ingredients | Parts by Weight |
|---|---|
| Xylene | 15 ml |
| Sodium | 7.5 gm. |

The mixture is heated to 90°C while stirring vigorously. When the sodium is completely dispersed in fine particles, the stirring is ceased and the heat source is removed after which time the mixture is cooled using an ice bath. When the sodium dispersion temperature reaches 30°C, the xylene is decanted and replaced with 200 ml of tetrahydrofuran. The suspension is heated to reflux and 11 gm. of 1,3,3-trimethyl-6-(3-chloropropyl)-bicyclo-[2.2.2]-octan-2-one are added. The reaction mass is then maintained at reflux for a period of 3 hours with moderate stirring. The sodium remains dispersed until 5 minutes before reflux is discontinued where upon it coagulates into a large ball. The heat source is then removed and stirring is ceased. The reaction mass is decanted from the sodium, acidified to a pH of 3 with 5 percent of hydrochloric acid and then neutralized to a pH 7 with a sodium bicarbonate solution. The organic layer is separated from the aqueous layer, and the aqueous layer is extracted four times with 100 ml portions of diethyl ether and vacuum distilled at a temperature of 120°C and a pressure of 0.6 mm. Hg. Mass spectral, IR and NMR analyses yield the data that the major product, obtained in 64 percent yield, is the title compound having the structure:

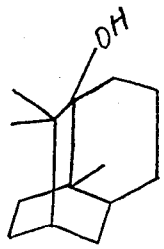

Mass spectral analysis is as follows: m/e = 208 (Parent Peak), 41, 84, 124, 81

NMR Analysis is as follows: 0.83(s,3H), 1.07(s,3H), 1.10(s,3H), 1.0–2.0 (Complex signals, 14H) ppm.

EXAMPLE XXVII

Preparation of
Octahydro-9,9-Dimethyl-1,6-methanonaphthalen-1-(2H)-Ol

Into a 250 ml three neck flask under helium and equipped with reflux condenser, stirrer, thermometer, and heating mantle, the following materials are placed:

| Ingredients | Parts by Weight |
|---|---|
| Lithium wire containing 1% sodium | 0.17 gm. |
| Diethyl ether (anhydrous) | 50.00 ml |
| 3,3-Dimethyl-6-(3-chloropropyl)-bicyclo-(2.2.2)-octan-2-one | 1.4 gm. |

The reaction mass is stirred at reflux for a period of 3½ hours. After standing overnight, an additional 50 ml of diethyl ether is added and then 50 ml of water. The ether layer is separated and the water layer is extracted once with diethyl ether. The combined ether layers are dried over anhydrous magnesium sulfate and stripped of solvent yielding an oil having two phases. This oil is redissolved in diethyl ether, redried over anhydrous magnesium sulfate and restripped of solvent yielding 0.9 gm. of oil. GLC (⅛ inch × 10', 10% carbowax, 100° to 220°C at 8°C per minute), IR and mass spectral analyses yield the information that 22 percent of the reaction mass is the title material having the structure:

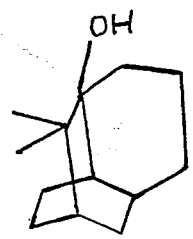

What is claimed is:

1. Octahydro-9,9-dimethyl-1,6-methanonaphthalen-1(2H)-ol having the structure:

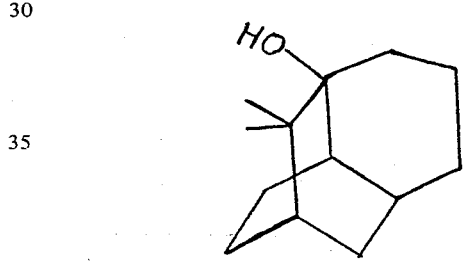

2. The compound having the structure:

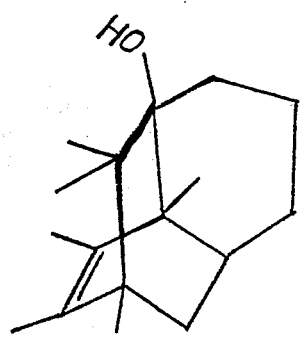

* * * * *